Patented June 23, 1936

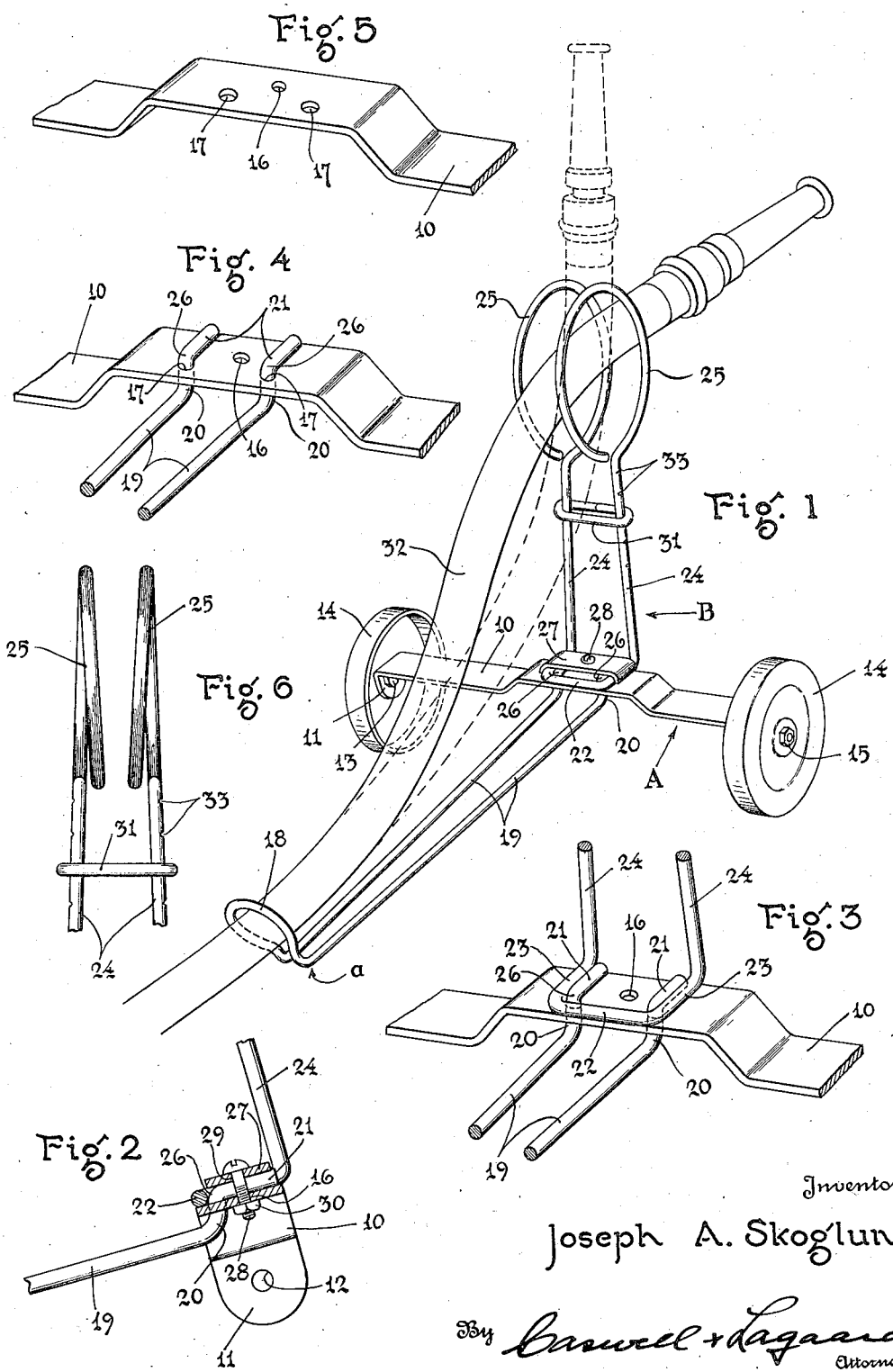

2,045,336

UNITED STATES PATENT OFFICE 2,045,336

HOSE HOLDING STAND

Joseph A. Skoglund, St. Paul, Minn., assignor to Constance Cronhardt, St. Paul, Minn.

Application May 19, 1934, Serial No. 726,502

8 Claims. (Cl. 248—80)

My invention relates to improvements in hose holding stands, an object of the invention being to provide a simple, durable, inexpensive and practical device for holding a garden hose with the nozzle end thereof adjustably disposed to direct the water from the nozzle in any direction desired.

Another object of the invention is to provide a device of the present kind having but few parts which may be shipped in compact knocked-down form and which may be quickly and easily assembled in its ultimate form.

Another object of the invention is to provide a wheeled stand of the present character which, though light in weight, is capable of securely holding a hose variously directed through a wide range of adjustments.

Another object of the invention is to provide a device of the present kind including a frame member, a trail formed of a single piece of wire and a holder likewise formed, all adapted to be readily interlocked with each other in the assembling of the device.

A further object of the invention is to provide a device of the present nature having jaws for adjustably holding a hose and having means for automatically locking the jaws in hose gripping relation.

With the foregoing and other objects in view, which will appear in the following description, the invention resides in the novel combination and arrangement of parts and in the details of construction hereinafter described and claimed.

In the drawing, Fig. 1 is a perspective view of a stand embodying my invention, said view showing the manner in which the stand adjustably holds a hose; Fig. 2 is a fragmentary sectional view taken in a central, vertical plane longitudinally of the rack and showing the interlocking engagement between parts of the device; Fig. 3 is a fragmentary perspective view showing the intermediate portion of the carriage frame bar and portions of the wire trail and wire holder as applied to said bar; Fig. 4 is a view similar to Fig. 3, showing the intermediate portion of the carriage frame bar and a portion of the wire trail as applied thereto; Fig. 5 is a fragmentary perspective view in detail of the intermediate portion of said carriage frame bar, and Fig. 6 is a fragmentary, elevational view of the holder showing particularly the upper portions of the holder legs and the inwardly spiralling portions of the ring-jaws formed on said legs.

Referring to the accompanying drawing, it will be seen that the device therein illustrated comprises a carriage A upon which a holder B is mounted.

The carriage A includes a cross frame bar 10, the ends of which are bent down to form ears 11. Each ear 11 has a bore 12 therein to receive a shouldered journal bolt 13 upon which a wheel 14 is secured, the journal bolts being clamped by the nuts 15 to their respective wheels 14 and said bolts being free to turn in the bores 12 in said ears 11. An arched platform portion intermediately of the frame bar 10 is formed with a central bolt receiving opening 16 therein. A pair of additional openings 17, also formed in said intermediate portion of said frame bar 10 are located in the rear margin of said bar, said openings 17 being equally spaced from said central bolt receiving opening 16. The carriage A further includes a trail a formed of a single length of wire bent intermediately thereof to form an upstanding eye 18 and reaches 19 diverging from said eye. Near the end of each reach 19 is a bend 20 which offsets from the reaches proper the end portions 21 thereof, as best shown in Figs. 2, 3, and 4 of the drawing. These offset end portions 21 of the trail reaches 19 are inserted through the openings 17 in the frame bar 10 from underneath said bar and the bends or offsets 20 disposed in said openings 17 with the end portions 21 of the reaches 19 overlying the upper side of the frame bar 10 transversely thereof.

The holder B is formed from a single length of wire bent to form an intermediate tie-bar reach 22 and foot reaches 23 at right angles thereto, said wire being further bent to form legs 24 and also facing ring-jaws 25 at the upper extremities of said legs. The foot reaches 23 of the holder bear upon the frame bar 10 and snugly straddle the offset end portions 21 of the trail reaches 19, the tie-stop reach 22 at the same time engaging shoulders 26 formed at the bends 20 in said trail reaches 19. Means common to the trail a and holder B secure both thereof to the frame bar 10, said means comprising a clamp bar 27 and bolt 28, said clamp bar having a bolt receiving opening 29 therein to receive said bolt. In clamping position, the clamp bar 27 is disposed with its end portions overlying the offset end portions 21 of the trail reaches 19 and also the foot reaches 23 of the holder, the ends of said end portions of said clamp bar being bent downwardly to conform with the sides of the foot reaches 23.

The clamping bolt 28 is inserted through the opening 29 in the clamp bar 27 and through the opening 16 in the frame bar 10. A nut 30 applied to said bolt 28 beneath the frame bar 10 is turned up against said bar. Through said bolt 28 and bar 27, the trail $a$ is rigidly clamped to said bar 19 substantially in the plane thereof, the holder B being at the same time clamped to said bar in an upstanding position. With the bends or offsets 20 in the trail reaches 19 held in position in the openings 17 in the frame bar 10, said trail is firmly held in right angular relation with respect to said frame bar. In turn, the holder B is kept from skewing on the frame bar by reason of the engagement of the foot reaches 23 of the holder with the offset end portions 21 of the trail reaches 19. In addition to being clamped upon the frame bar 10 and held against skewing thereon, the holder B is secured against any tendency to slide forwardly on the frame bar by the engagement of the tie-stop reach 22 with the shoulders 26 at the offsets 20 in the trail reaches 19. To secure the holder B against any tendency to slide rearwardly on the frame bar 10, the clamp bar 27 is arranged so that the forward edge thereof engages the legs 24 as best shown in Fig. 2.

The facing ring-jaws 25 are so formed at the upper extremities of the legs 24 that the axis of each leg passes diametrically through its respective ring-jaw, the wire, in each case, being curved forwardly from the leg 24 and thence back to complete the circle, the back turned portion of each ring-jaw spiralling inwardly out of the plane of the forwardly curved portion as shown in Figs. 1 and 6. The wire of the holder B, though relatively stiff, is somewhat resilient, the construction of the holder being such that the legs 24 tend to spring apart and separate the ring-jaws 25. Countering this tendency of the legs 24 to spring apart, is a tie-link 31 which connects the two legs together and is slidable up and down thereon. This tie-link 31 is shorter than the distance between the legs 24 at the lower portion of the holder wherefore said legs are flexed by said tie-link in upwardly converging relation.

The parts going to make up a complete device may be packed compactly in a carton of relatively small dimension, the parts being readily assembled simply by bolting the wheels 14 to the frame bar 10 and fastening the trail $a$ and holder B to said frame bar through the medium of the clamp bar 27 and bolt 28.

In the use of the device, a hose, as at 32, is threaded through the eye 18 of the trail $a$ and the nozzle end of the hose passed between the facing ring-jaws 25 where it is received relatively freely with the tie-link 31 in its uppermost position. To clamp the hose in the ring-jaws 25, the tie-link 31 may be pressed downwardly on the legs 24 to swing said legs toward one another and force the ring-jaws against the opposite sides of the hose. With the tie-link 31 thus positioned, it holds and locks the ring-jaws 25 against the hose, said tie-link being secured against accidentally slipping upwardly on the tensioned converging legs by the engagement of said link in notches 33 formed at intervals along said legs. Another and probably more convenient method of clamping the ring-jaws 25 upon the hose is to press said ring-jaws together with the fingers applying sufficient force slightly to flatten the hose. In so doing, the tie-link 31 slips by gravity down the legs 24 into a position where it will keep said legs and the ring-jaws 25 from spreading apart when the pressure of the fingers upon the jaws is released. Upon being clamped between the ring-jaws 25, the hose may be shifted angularly in the grip thereof to direct the nozzle of the hose at any angle desired including even a vertical disposition of the nozzle as shown in dotted lines in Fig. 1. The inwardly spiralling rearwardly curved portions of the ring-jaws 25 are sprung outwardly by the hose and being thus put under tension grip the hose at the rear portions of ring-jaws with approximately the same force as the hose is gripped by the forward portions of said jaws. Without turning off the water, the inclination of the nozzle may be changed as desired. And, too, the stand may be wheeled backward and forward along the ground and turned from side to side at any angle by manipulating the attached hose.

In using the device, substantially all of the strain imparted thereto from the hose is met by the trail $a$ through the eye 18 thereof, thus leaving the nozzle end of the hose practically undisturbed in the grip of the ring-jaws 25. The holder B being inclined rearwardly brings the centers of gravity of the stand and of the supported portion of the hose back of the axis of the wheels 14 where the weight tending to tip the device backward is met by the trail $a$. This arrangement effectively prevents the device from toppling over.

In detaching the device from a hose, the tie-link is pulled upwardly on the legs 24 to release the grip of the ring-jaws 25 on the hose, said hose being then easily withdrawn from said ring-jaws and from the eye 18 of the trail $a$.

Changes in the specific form of my invention as herein disclosed, may be made within the scope of what is claimed without departing from the spirit of my invention.

Having described my invention, what I claim as new and desire to protect by Letters Patent is:

1. In a device of the character described, a cross frame bar, a trail secured to said bar and having an upstanding eye at the end thereof, a holder formed from a single length of wire bent to form an intermediate reach, foot reaches and upstanding legs terminating in facing ring-jaws, means for clamping the foot reaches of the holder against the frame bar of the carriage, the legs of the holder tending to spring apart at their upper ends and separate the ring-jaws, a tie-link slidable on said legs and securing them in relation converging upwardly, the ring jaws of the holder being adapted in an elevated position of said link to receive the nozzle end of a hose inserted through the eye in the trail, said link being adapted by gravity to slip down the legs of the holder into a position locking the ring-jaws in such hose clamping relation as they may be forced to assume.

2. In a device of the character described, a support, a holder mounted on said support and including upstanding legs terminating in facing ring-jaws, said legs tending to spring apart at their upper ends and separate said ring-jaws, a tie link slidable on said legs and securing them flexed in relation converging upwardly, said ring jaws being adapted in an elevated position of said link to receive a hose between them, said link being adapted by gravity to slip down the legs of the holder into a position locking the ring jaws in such hose clamping relation as they may be forced to assume.

3. In a device of the character described, a support, a holder mounted thereon and comprising two legs of wire correspondingly bent to provide facing ring-jaws adapted to receive a hose between them, means acting upon the legs to hold the jaws clamped against the hose, the end portions of the ring-jaws being spirally bent inward toward each other to provide an equalized grip on the hose at diametrically opposed portions of said ring-jaws.

4. In a device of the character described, a support, a holder mounted thereon and including a pair of spaced upstanding legs terminating at their upper ends in cooperating jaws, said legs having portions thereof extending in upwardly converging relation, a tie-link slidable on said converging portions of said legs, said jaws being adapted in an elevated position of said link to receive a hose between them, said link serving upon being depressed to swing the legs of the holder together and clamp the jaws against the hose.

5. In a device of the character described, a movable support having an upstanding eye, a holder mounted on said support at a point removed from said eye, said holder including upstanding legs terminating in facing ring-jaws adapted to receive between them the end of a hose threaded through said eye, said jaws being adapted to close together in a vertical plane passing through said eye, and means for clamping the ring-jaws upon the hose.

6. A device of the character described including a carriage cross frame bar carried by supporting means adapted to travel along the ground, a nozzle holder mounted thereon, and a trail attached thereto for bracing the same, the intermediate portion of said bar having a central bolt receiving opening therein and two additional openings at its rear margin equally spaced from said central opening at opposite sides thereof, the trail being formed from a length of wire bent to form a hose guiding eye at the junction of companion reaches, each reach having an offset near the end thereof forming a shoulder, the end portions of said reaches extending through said marginal openings and overlying the bar with the offsets disposed within said openings, the holder being formed from a length of wire bent to form an intermediate tie-stop reach, a pair of foot reaches, and a pair of upstanding legs with nozzle gripping members thereon, said foot reaches snugly straddling the end portions of the trail reaches, a clamp bar overlying said end portions of the trail and the foot reaches of the holder, a clamping bolt passing through the clamp bar and the bolt receiving opening in the frame bar, the forward edge of the clamp bar engaging the legs of the holder, the tie-stop reach of said holder engaging said shoulders at the offsets in the end portions of the trail.

7. A device of the character described including a carriage cross frame bar carried by supporting means adapted to travel along the ground, a nozzle holder mounted thereon, and a trail attached thereto for bracing the same, the intermediate portion of said bar having a pair of openings therein, the trail being formed from a length of wire bent to form a hose guiding eye at the junction of companion reaches, said reaches having offset end portions extending through said pair of openings in the frame bar with the offsets disposed within said openings, the holder being formed from a length of wire bent to form an intermediate reach, foot reaches, and a pair of upstanding legs with nozzle gripping members thereon, said foot reaches and intermediate reach interlocking with the offset end portions of the trail, and means common to said end portions of the trail and the foot reaches of the holder for clamping the same against the carriage frame bar.

8. In a device of the character described, a support, a trail secured thereto and having an upstanding eye at its free extremity, a holder mounted on said support and comprising upstanding resilient legs terminating in facing ring-jaws, said legs being adapted normally to spring apart to admit of the ready insertion between them of a hose inserted through the eye of the trail, and means slidable on said legs and acting to flex them toward each other to clamp said ring-jaws against the hose.

JOSEPH A. SKOGLUND.